Nov. 25, 1958     G. H. STEPHENSON     2,861,742
RATE MEASURING APPARATUS
Filed Aug. 27, 1954
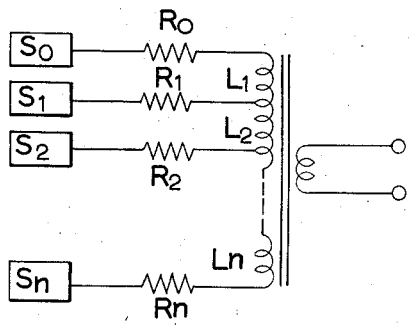
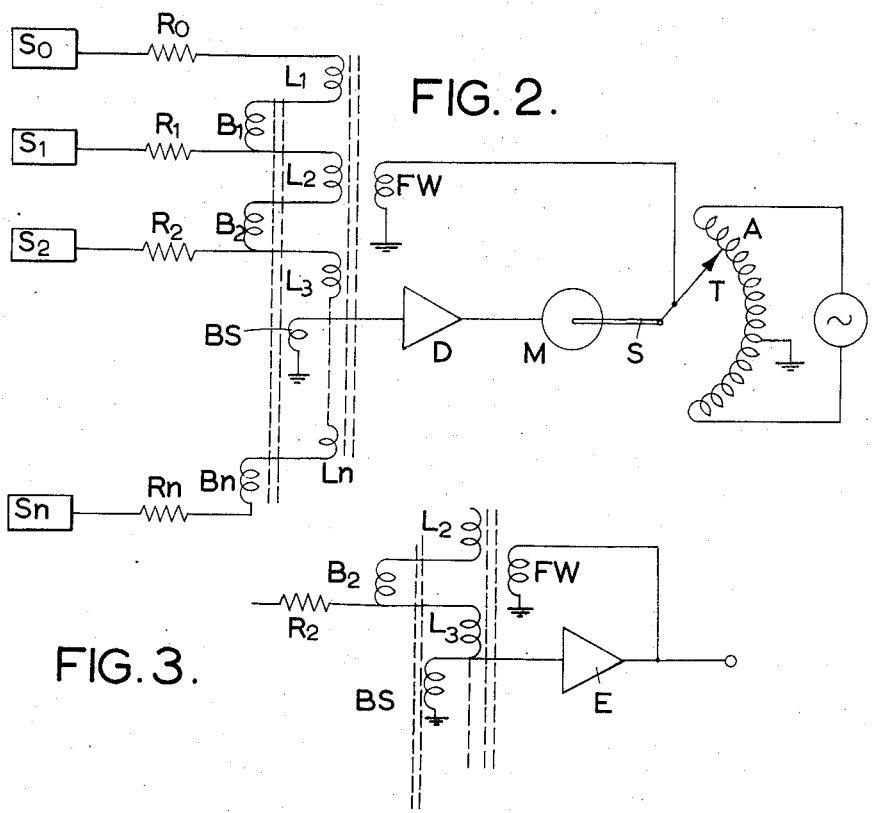
INVENTOR
G. H. Stephenson
BY
ATTORNEYS

United States Patent Office 2,861,742
Patented Nov. 25, 1958

2,861,742
RATE MEASURING APPARATUS

Geoffrey Huson Stephenson, Ealing, London, England, assignor to Electric & Musical Industries Limited, Hayes, Middlesex, England, a company of Great Britain Application August 27, 1954, Serial No. 452,646

Claims priority, application Great Britain September 11, 1953

4 Claims. (Cl. 235—61)

This invention relates to apparatus for evaluating the rate of change of a variable with respect to a second variable. The invention relates in particular to apparatus of the kind described in the specification of United States Patent application Serial No. 207,490, filed January 24, 1951.

According to the said United States specification there is provided apparatus for evaluating the rate of change of one variable with respect to a second variable comprising a tightly coupled auto-transformer, impedances leading to points on said auto-transformer representing values of said second variable, means for applying alternating voltages to said impedances with amplitudes representative of values of said first variable for the values of said second variable represented by the corresponding points, said auto-transformer having a high shunt impedance to produce a voltage gradient along said auto-transformer in response to said applied voltages representative of a smoothed rate of change of said first variable with respect to said second variable.

Figure 1 of the accompanying drawings illustrates in simplified manner the basic features of the form of rate evaluating apparatus disclosed in the aforesaid United States patent specification. The apparatus consists of a tightly coupled auto-transformer L which is not tied to any reference potential. Resistors $R_0$, $R_1$ . . . $R_n$ are connected as shown to points spaced along auto-transformer L whereby the auto-transformer is divided into a series of sections $L_1$, $L_2$ . . . $L_n$. The impedances are employed to apply alternating voltages from a corresponding series of sources $S_0$, $S_1$ . . . $S_n$ to the auto-transformer L. The sources $S_0$, $S_1$ . . . $S_n$ are analogue stores and the voltages which are applied from them to the resistors $R_0$, $R_1$ . . . $R_n$ have amplitudes representing the instantaneous value of the first variable corresponding to the discrete values of the second variable represented by the points of connection of the resistors to the auto-transformer L. The analogue voltages all have the same phase, being for example derived from a single reference voltage source. The auto-transformer sections $L_1$, $L_2$ . . . $L_n$ have a common secondary winding LS and in operation of the apparatus the voltage set up across the secondary winding LS representes the desired rate.

As pointed out in the specification of United States Patent application Serial No. 207,490 when alternating voltages are applied from the sources $S_0$, $S_1$ . . . $S_n$ as aforesaid, the amplitude gradient of the voltage across the auto-transformer L represents a smoothed rate of change of the variable and in theory the smoothing is optimum when the total ampere turns of the auto-transformer sections $L_1$, $L_2$ . . . $L_n$ is zero. This implies an infinite shunt impedance for the auto-transformer L and in practice this condition cannot be realised since the auto-transformer would then require a core having infinite permeability and no power loss. The practical limitations of the auto-transformer therefore represent an error in the smoothing.

The object of the present invention is to reduce the aforesaid error.

The present invention is an improvement in or modification of the invention claimed in the specification of United States Patent application Serial No. 207,490 and according to the present invention apparatus for evaluating the rate of change of one variable with respect to a second variable comprising an auto-transformer, impedances leading to points on said auto-transformer representing values of said second variable, means for applying alternating voltages to said impedances with amplitudes representative of said first variable for the values of said second variable represented by the corresponding points, means for applying a feedback signal to said auto-transformer capable of varying the flux associated with said auto-transformer and means for varying said feedback signal in response to the total ampere turns of said auto-transformer so as to tend to reduce said total to zero, thereby to produce a voltage gradient along said auto-transformer in response to the applied voltages representative of a smoothed rate of change of said first variable with respect to said second variable.

Two examples of the present invention are illustrated in Figures 2 and 3 of the accompanying drawings.

Referring to Figure 2, the rate evaluating apparatus is generally of the same construction as that described with reference to Figure 1 and corresponding parts have been denoted by the same reference numerals. The apparatus, however, includes a system of monitoring windings $B_1$, $B_2$ . . . $B_n$, a monitoring winding being placed in series with each of the section $L_1$, $L_2$ . . . $L_n$ of the auto-transformer. The monitoring respective sections are thus traversed by the currents in the windings $L_1$, $L_2$ . . . $L_n$ but they are not directly magnetically coupled thereto. They are, however tightly magnetically coupled one to another, and they have a secondary winding BS the voltage output of which is amplified in an amplifier D and then applied to a servo-motor M as the input signal thereto. The shaft S of the servo-motor M drives a variable tap T of an auto-transformer A which is energised with an alternating voltage of fixed amplitude derived from the aforesaid reference source. The voltage set up at the tap T of the auto-transformer A is applied to a feedback winding FW which is coupled with the auto-transformer L. The sense of winding FW is, moreover, such that the voltage applied to it tends to oppose any nett flux in the core in the windings $B_1$, $B_2$ . . . $B_n$, by tending to reduce to zero the total ampere turns of the auto-transformer sections $L_1$, $L_2$ . . . $L_n$.

In operation of the arrangement described, in so far as the total ampere turns of auto-transformer sections $L_1$, $L_2$ . . . $L_n$ is not zero, the total ampere turns of the windings $B_1$, $B_2$ . . . $B_n$ will not be zero and the signal derived from BS will represent a departure of the system from the ideal state. The amplitude of the voltage derived from the tap T being the same as that across FW will represent the amplitude gradient of voltage along the auto-transformer L and this, when the signal derived from BS approaches zero represents the desired smoothed rate to a high degree of accuracy.

The example of the invention illustrated in Figure 3 is similar to that shown in Figure 2 except that the signal applied to the feedback winding is derived directly from a high gain amplifier E instead of through the intermediary of a servo-motor. In this application of the invention the amplifier E is required to have a high negative feedback loop gain, say of the order of 2,000.

The invention is readily applicable to the form of apparatus disclosed in the specification of United States patent application Serial No. 282,854 in which case the monitoring winding would be connected between each transformer section and a neighbouring switch.

What I claim is:

1. Apparatus for evaluating the rate of change of one variable with respect to a second variable comprising an auto-transformer, impedances leading to points on said auto-transformer representing values of said second variable, means for applying alternating voltages to said impedances with amplitudes representative of said first variable for the values of said second variable represented by the corresponding points, means for applying a feedback signal to said auto-transformer capable of varying the flux associated with said auto-transformer, and means for varying said feedback signal in response to the total ampere turns of said auto-transformer so as to tend to reduce said total to zero, thereby to produce a voltage gradient along said auto-transformer in response to the applied voltages representative of a smoothed rate of change of said first variable with respect to said second variable.

2. Apparatus for evaluating the rate of change of one variable with respect to a second variable comprising an auto-transformer, impedances leading to points on said auto-transformer representing values of said second variable whereby said auto-transformer comprises a plurality of sections, means for applying alternating voltages to said impedances with amplitudes representative of said first variable for the values of said second variable represented by the corresponding points, means for applying a feedback signal to said auto-transformer capable of varying the flux associated with said auto-transformer, a plurality of monitoring windings one inserted in each section of said auto-transformer to be traversed by the current of the respective section, said monitoring windings being magnetically coupled together and being magnetically uncoupled to said sections, a secondary winding magnetically coupled to said monitoring windings whereby a voltage can be derived from said secondary winding representing the total ampere turns of said auto-transformer sections, and means for varying said feedback signal in response to the voltage across said secondary winding so as to tend to reduce said ampere turns to zero, thereby to produce a voltage gradient along said auto-transformer in response to the applied voltage representative of a smooth rate of change of said first variable with respect to said second variable.

3. Apparatus according to claim 2 said means for varying the feedback signal comprising a servo-motor responsive to the voltage set up across said secondary winding, a variable ratio transformer, means for energising the primary turns of said transformer with a reference voltage, and said servo-motor being operative to vary the transformation ratio of said transformer to produce said feedback signal across secondary turns thereof.

4. Apparatus according to claim 3 said means for varying the feedback signal comprising a negative feedback amplifier for amplifying the voltage across said secondary winding to derive said feedback signal.

References Cited in the file of this patent

UNITED STATES PATENTS

| | | |
|---|---|---|
| 2,590,428 | Noxon | Mar. 25, 1952 |
| 2,613,350 | Kellogg | Oct. 7, 1952 |
| 2,613,352 | Kellogg | Oct. 7, 1952 |